United States Patent
Kelly et al.

(10) Patent No.: US 10,918,965 B1
(45) Date of Patent: Feb. 16, 2021

(54) WEARABLE AND ILLUMINATING MASK

(71) Applicant: LIGHTUPTOYS.COM LLC, Sellersburg, IN (US)

(72) Inventors: Christopher Kelly, New Albany, IN (US); Joshua C. Kelly, Sellersburg, IN (US); Max Armendariz Lalama, Georgetown, IN (US); Ariel Macaulay Bruton, Louisville, KY (US)

(73) Assignee: LightUpToys.com, LLC, Sellersburg, IN (US)

( * ) Notice: Subject to any disclaimer, the term of this patent is extended or adjusted under 35 U.S.C. 154(b) by 0 days.

(21) Appl. No.: 16/709,241

(22) Filed: Dec. 10, 2019

Related U.S. Application Data (62) Division of application No. 16/599,253, filed on Oct. 11, 2019, now Pat. No. 10,751,637.

(Continued)

(51) Int. Cl.
| | |
|---|---|
| *F21V 15/00* | (2015.01) |
| *A63J 7/00* | (2006.01) |
| *F21V 15/01* | (2006.01) |
| *F21V 23/00* | (2015.01) |
| *F21V 23/02* | (2006.01) |
| *F21V 5/00* | (2018.01) |
| *F21V 33/00* | (2006.01) |
| *F21V 23/04* | (2006.01) |
| *F21W 121/06* | (2006.01) |
| *F21Y 103/10* | (2016.01) |
| *F21Y 115/10* | (2016.01) |

(52) U.S. Cl.
CPC .............. *A63J 7/005* (2013.01); *F21V 5/00* (2013.01); *F21V 15/01* (2013.01); *F21V 23/002* (2013.01); *F21V 23/02* (2013.01); *F21V 23/04* (2013.01); *F21V 33/0008* (2013.01); *F21W 2121/06* (2013.01); *F21Y 2103/10* (2016.08); *F21Y 2115/10* (2016.08)

(58) Field of Classification Search
CPC ............ F21V 33/0004; F21W 2121/06; A61N 2005/0652; A61N 2005/0663; A61N 2005/0654; A61N 2005/0666; A61N 2005/063; F21Y 2115/10; G02C 11/04; G02C 5/001; A41D 27/085; A41G 7/00; A61P 17/10
See application file for complete search history.

(56) References Cited

U.S. PATENT DOCUMENTS

| | | | |
|---|---|---|---|
| 6,824,265 B1 * | 11/2004 | Harper | G02C 11/04 351/158 |
| 10,751,637 B1 | 8/2020 | Kelly et al. | |

(Continued)

*Primary Examiner* — William J Carter
*Assistant Examiner* — Omar Rojas Cadima
(74) *Attorney, Agent, or Firm* — Scott R. Cox; Jessica C. Lindner (57) ABSTRACT

A wearable, illuminating mask including a facepiece with slots located in side edges of the facepiece, wherein the facepiece is connected to bases of temples, wherein each base of temples includes a front and back cover that are attachable to one another. The front and back covers each include an inner wall portion, which portions each comprise a c-shaped support. These c-shaped supports extend towards each other when the front and back covers are connected together and form a cradle that align an LED with the slots of the facepiece, so as to illuminate the mask at specifically designed portions.

20 Claims, 6 Drawing Sheets

Related U.S. Application Data

(60) Provisional application No. 62/791,076, filed on Jan. 11, 2019.

(56) References Cited

U.S. PATENT DOCUMENTS

| | | | | |
|---|---|---|---|---|
| 2007/0195515 | A1* | 8/2007 | Waters | F21V 21/0885 362/103 |
| 2008/0151179 | A1* | 6/2008 | Howell | G02C 11/00 351/158 |
| 2011/0075095 | A1* | 3/2011 | Waters | G02C 11/04 351/158 |
| 2013/0335694 | A1* | 12/2013 | Huang | G02C 7/021 351/51 |
| 2016/0045760 | A1* | 2/2016 | Tapper | A61N 5/0616 607/90 |
| 2019/0015680 | A1* | 1/2019 | Dai | H05K 1/189 |
| 2019/0126060 | A1* | 5/2019 | Dijkstra | F21L 4/02 |

* cited by examiner

WEARABLE AND ILLUMINATING MASK

CROSS REFERENCE TO RELATED APPLICATION

This Application claims priority from provisional application Ser. No. 62/791,076, filed Jan. 11, 2019, and from nonprovisional application Ser. No. 16/599,253, filed Oct. 11, 2019.

FIELD OF THE INVENTION

The present invention relates to a wearable, illuminating mask that has temples, which each include a base with supports that cradle a LED in an orientation to illuminate specifically designed portions of a facepiece thereof.

BACKGROUND

Wearable masks, such as costume masks, have existed for decades, having been used, for example, in the performing arts and worn for special events. Costume masks that illuminate have been disclosed using a battery powered mechanism, but generally these masks are made of a material that is not comfortable for the wearer.

Further, in previously disclosed wearable masks, the entire face mask illuminates, rather than only specifically designed portions of the mask. Further, specific illuminated portions of the mask have been difficult to adhere as they generally utilize light emitting diode ("LED") strips placed around the outer surface of the mask, which do not provide an aesthetically pleasing "edge-lit" effect on an outer edge of the mask.

SUMMARY OF INVENTION

The inventors have discovered a wearable mask to illuminate via a battery powered mechanism by an on/off switch or remote control. In addition, the inventors have discovered specifically designed portions of the wearable mask that illuminate to create a unique pattern or design on a facepiece of the mask. Further, the inventors have discovered a structure to light the edge of an outer edge of the mask to provide an "edge-lit" effect.

One aspect of the invention is a wearable, illuminating mask including a facepiece, temples comprising a base connected to an outer edge of the facepiece, arms extending away from the base, wherein each base of the temples includes a front and back cover that are attachable to one another, wherein the front and back covers each include an inner wall portion, wherein the inner wall portion of the front cover and the inner wall portion of the back cover comprise c-shaped supports, wherein the c-shaped support of the inner wall portion of the front cover extends towards the c-shaped support of the inner wall portion of the back cover when the front and back covers are connected, LEDs connected to the c-shaped supports and straps with a first and second end, and wherein the first end is connected to arms and the second end is connected to a housing.

DETAILED DESCRIPTION OF DRAWINGS

Shown in FIGS. 1-6 is one embodiment of a wearable, illuminating mask 10. The wearable, illuminating mask includes a facepiece 20, temples 30, wherein each temple is connected to the facepiece at a base 40 of the temples, arms 50 connected to and extending away from the bases of the temples, straps 60 connected to the arms, and a housing 70 connected on each side to the conjoining straps.

The facepiece 20 of the wearable, illuminating mask 10 includes eyeholes 21 and a nosepiece 22, as shown in FIGS. 1-4, which are cutout of the facepiece so as to fit a user's face as comfortably as possible. In addition, the facepiece is concave in shape so as to fit a wearer's face.

Figure 1:
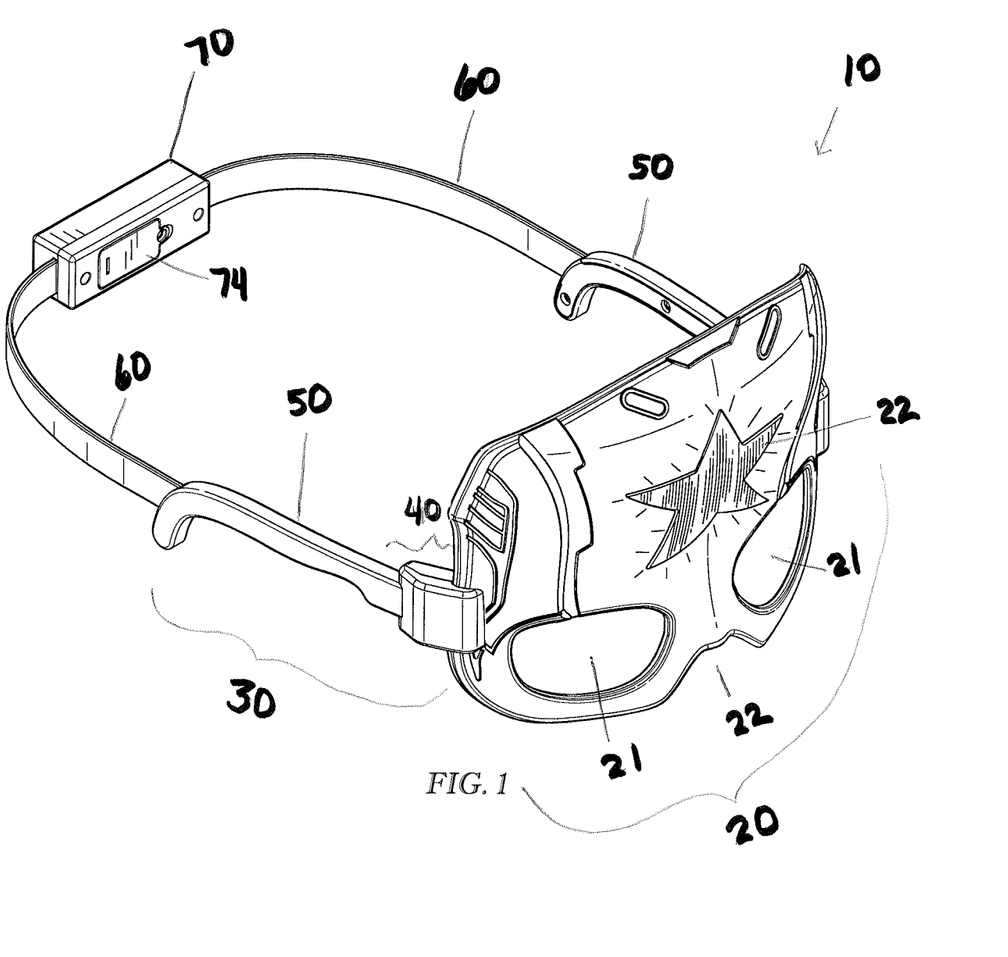
FIG. 1 is a perspective view of a wearable, illuminating mask.
Figure 2:
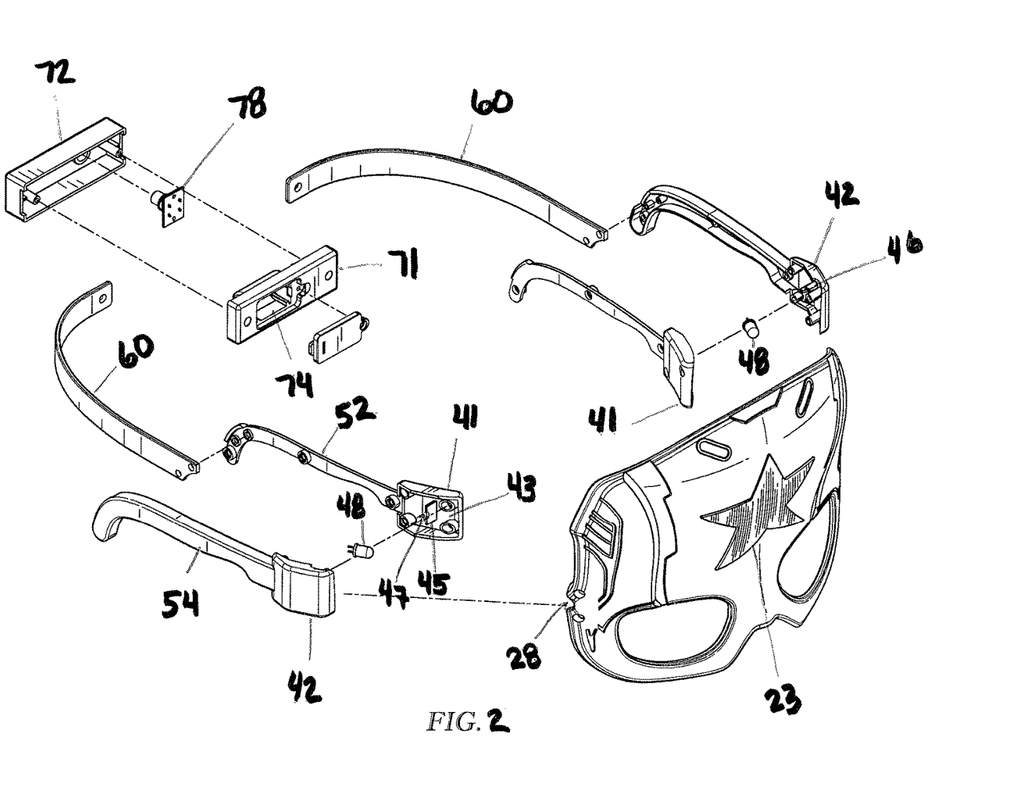
FIG. 2 is an exploded perspective view of the wearable, illuminating mask of FIG. 1.
Figure 4:
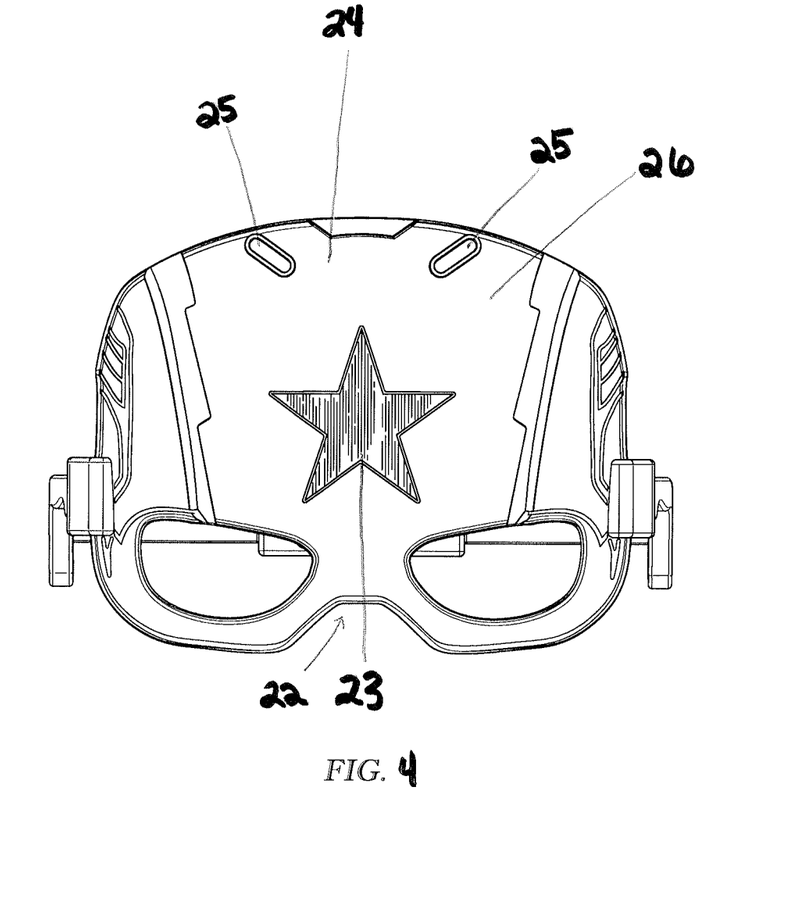
FIG. 4 is a front view of the wearable, illuminating mask of FIG. 1.
Figure 5:
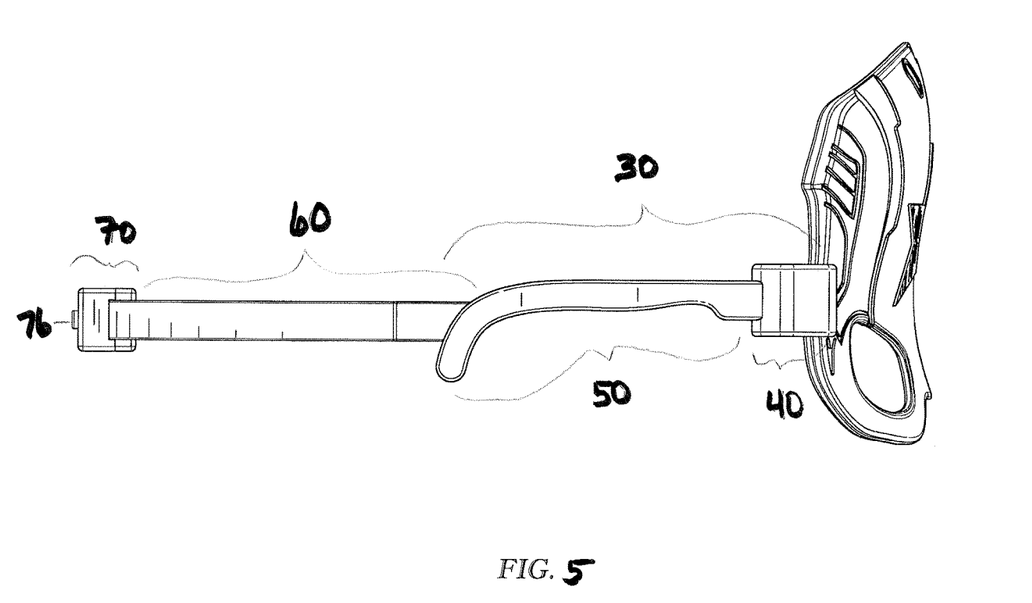
FIG. 5 is a side view of the wearable, illuminating mask of FIG. 1.
Figure 6:
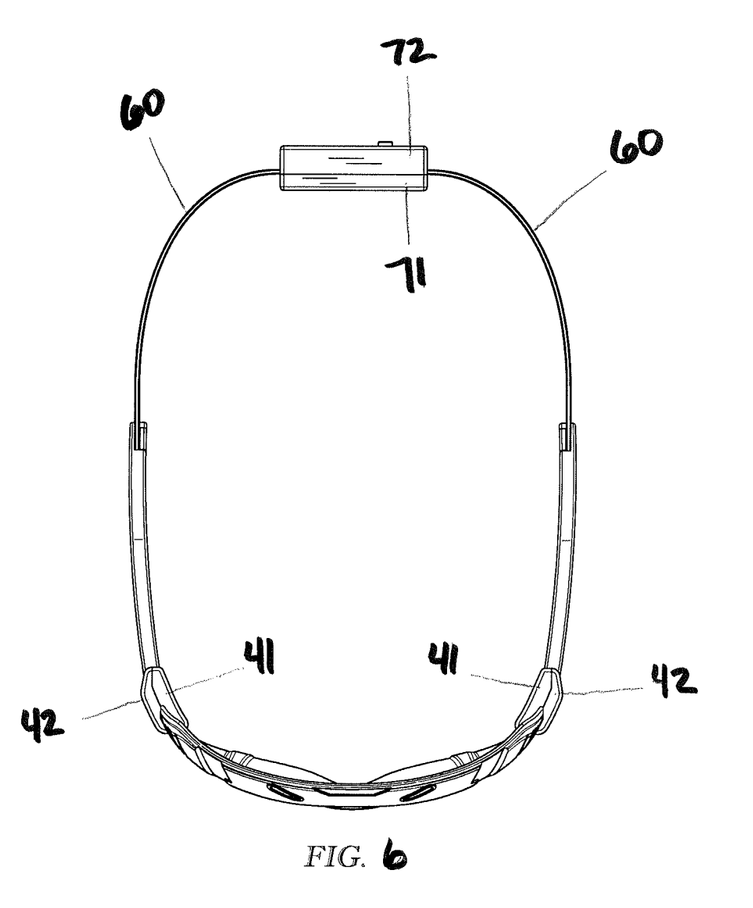
FIG. 6 is a top view of the wearable, illuminating mask of FIG. 1.

The facepiece is made of a material such as acrylic plastic that is capable of being dropped without breaking or cracking. The material is also capable of refracting light throughout the facepiece, particularly through etched portions 22 of the facepiece, as shown in FIGS. 1-2 and 4. Any methodology can be used to create the etched effect, such as sandblasting, laser, or screen printing, which creates a "rough" surface during injection molding. This etching provides a surprising effect as light refracted through the mask will specifically illuminate these etched portions with increased luminosity. In the embodiment shown in FIGS. 1-2 and 4, a star is etched into the facepiece, so that when light is refracted throughout the facepiece, the star will be specifically illuminated. This etched portion can be any shape, design, pattern, or character. Further, any portion of the facepiece can include etching to create any design or pattern preferred by the wearer.

FIG. 2 further illustrates an embodiment where an outer edge 27 of the facepiece is etched. Accordingly, when illuminated, the edge of the facepiece glows and thus outlines the facepiece on the wearer's face. This provides an aesthetically pleasing edge-lit effect on the facepiece without the need to enwrap the edge of the facepiece with string LED lights, as was done in prior art. Accordingly, far superior results are achieved with a more user-friendly and wearable mask.

Equally as important, the facepiece includes non-etched portions 24, as shown in FIG. 4. The non-etched portions do not illuminate or illuminate with a reduced luminosity. The combination of etched and non-etched portions provides a user with the ability to highlight portions of the mask they wish to illuminate through a contrast of the illuminated etched portions and non-illuminated non-etched portions. A combination of both etched and non-etched portions, along with the "edge-lit" effect around the outer edge of the facepiece, creates the full illusion of the design of the mask. Advantageously, this combination makes it appear that the wearer is not even wearing a mask at all, but rather that the mask is a part of the wearer's face.

The facepiece further includes open portions 25, as shown in FIGS. 1-2 and 4, that are cut out of the facepiece, preferably to aid in forming a unique pattern to be illuminated in the facepiece. The open portions may include an etched outline so that the edge surrounding the open portions is illuminated, while the open portions do not illuminate so as to form a unique pattern. The mask further includes non-opened portions 26. The non-opened portions may or may not include etching and may or may not be illuminated.

Figure 3:
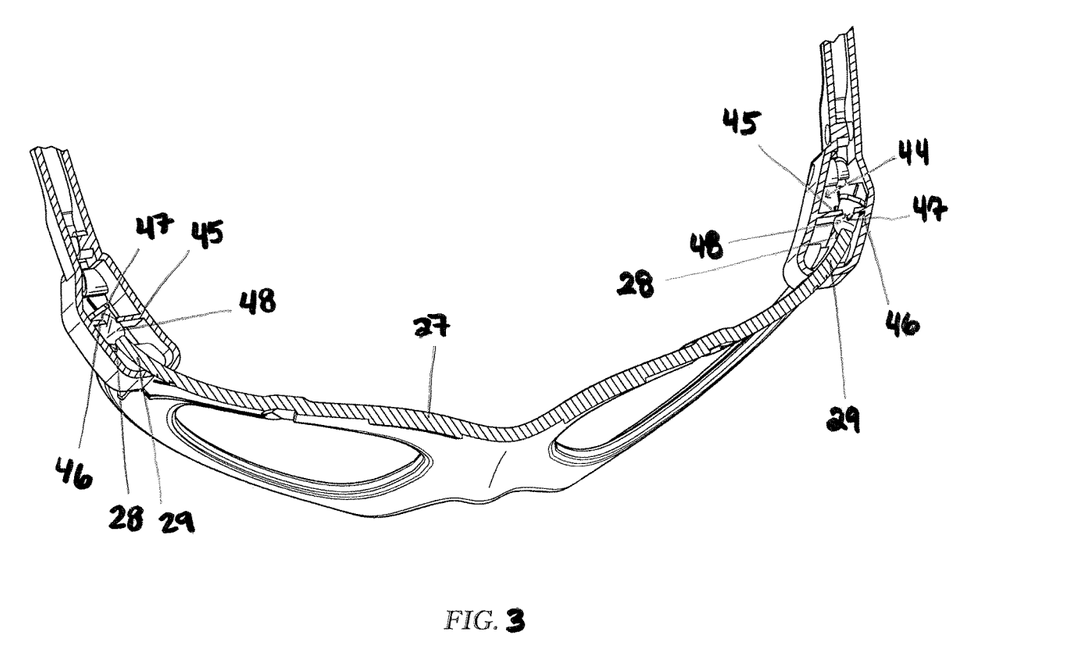
FIG. 3 is a partial top, perspective view of the wearable, illuminating mask of FIG. 1.

As shown in FIGS. 2-3, the facepiece 20 further includes slots 28 located in outer, side edges 29 of the facepiece. These slots point towards the facepiece at a specifically oriented angle and are shaped so as to cradle an LED.

The facepiece 20 is connected on each outer side edge 29 to the temples 30. As shown in FIGS. 1-2 and 5-6, the wearable, illuminating mask 10 includes two temples, wherein one temple is connected to a right outer side edge of the facepiece and the other temple is connected to a left outer edge of the facepiece. Specifically, each temple includes a base 40 that is connected around each outer side edge of the facepiece. The bases each include a front cover 41 and a back cover 42 that are securable to one another, for example via screws or a snap fit. The front and back covers each include an inner wall portion (43, 44) that are located on an inner surface of the front and back covers. These inner wall portions both include a c-shaped support (45, 46) that are secured to the respective inner wall portions. For example, these c-shaped supports may be molded during manufacturing as a part of the front and back covers. As shown in FIGS. 2-3, the c-shaped support of the inner wall portion of the front cover extends towards the c-shaped support of the inner wall portion of the back cover when the front and back covers are secured. When secured, the c-shaped supports form a cradle 47 that houses a LED 48, as shown in FIG. 3. As shown in FIGS. 1, 3-6, the front and back covers preferably secure around the outer edge of the facepiece, so as to align the LEDs connected to the cradles with the slots 28 located in the outer side edges of the facepiece. The combination of the c-shaped-supports and the slots align the LED at a specific angle so as to illuminate the portions of the facepiece that should be illuminated, i.e, the etched portions 23. This provides a far superior wearable, illuminating mask and only requires two LEDs to illuminate the entirety of the facepiece. A combination of specific c-shaped supports, specifically oriented slot in the outer edge of the facepiece, the material of the plastic, the concave curve of the facepiece, and the etched and non-etched portions create a wearable, illuminating mask 10 that is far superior to prior art masks.

The bases 40 of the temples 30 are connected on an opposite end to arms 50 that extend away from the bases of the temples, as shown in FIGS. 1-2 and 5-6. These arms are similar to arms of glasses and are curved on one end to rest on a wearer's ears, as normal glasses would. The arms include a front casing 52 and a back casing 54, which front and back casings are securable together in a similar fashion as the front and back covers (41, 42) of the bases, for example by screws or a snap fit, as shown in FIG. 2.

The arms 50 are connected on an opposite end to straps 60 that secure to the arms, for example by screws or a snap fit, as shown in FIGS. 1-2 and 5-6. These straps are preferably adjustable in length to accommodate a range of head sizes.

The straps 60 join together on each side of a housing 70, as shown in FIGS. 1-2 and 5-6. The housing includes a front case 71 and a back case 72, which are securable, for instance via screws or a snap-fit. The housing includes various components, such as a battery compartment 74 that houses batteries (not shown) that power the LEDs of the mask 10. The housing further includes a switch 76, such as an on/off button that controls illumination of the mask. In another embodiment, the switch may be located on the temple of the mask, so a wearer can turn the mask on by reaching to his/her temple, rather than around the back of his/her head.

In another embodiment (not shown), the switch can be located in the housing 70 and the mask 10 can further include a communication system, for example in the bases 40 of the temples 30 that allows the mask to respond to and communicate with a remote signal. Therefore, the wearer or someone else can remotely control the wearable, illuminating mask through use of a remote control signal, for instance from a cellphone.

In one embodiment (not shown) the housing 70 further includes control circuitry connected to the LEDs 48, the control circuitry comprises a receiver and a proximity detection device. The control circuitry is operable to detect a first signal location proximate to a first proximity beacon and illuminate the LEDs in a pattern associated with the first signal location. The control circuitry can be programmed to detect unlimited signals so as to illuminate the LEDs in infinite patterns.

The housing 70 further includes a printed circuit board ("PCB") 78, as shown in FIG. 2, that is electrically connected to the LEDs 48. Wiring (not shown) runs from the PCB through the straps, through the arms 50 and through the bases 40 and is connected to the LEDs. The PCB is programmed to control the LEDs so that when a user presses the switch, the LEDs sequence through a variety of settings, such as static on, fade, or quick flash. The LEDs can vary in color, size, and there can be any number of LEDs present.

While several embodiments of the present invention have been shown and described, it is understood that many changes and modifications can be made thereto without departing from the scope of the inventions as disclosed herein.

LISTING OF ELEMENTS

Wearable, illuminating mask 10
Facepiece 20
Eyeholes 21
Nosepiece 22
Etched portions 23
Non-etched portions 24
Open portions 25
Closed portions 26
Edge 27
Slots 28
Side, edge 29
Temples 30
Base 40
Front cover 41
Back cover 42
Inner wall portion of the front casing 43
Inner wall portion of the back casing 44
c-shaped support of the front casing 45
c-shaped support of the back casing 46
Cradle 47
LED 48
Arms 50
Front casing 52
Back casing 54
Straps 60
Housing 70
Front case 71
Back case 72
Battery compartment 74
Batteries (not shown)
Switch 76

Printed Circuit Board 78
Wiring (not shown)

The invention claimed is:

1. A wearable, illuminating mask comprising:
   a facepiece comprising eyeholes, a nosepiece and etched and non-etched portions, wherein an outer edge of the facepiece is etched;
   temples, each temple comprising a base connected to the facepiece and an arm extending away from the base;
   wherein each base of the temples comprises a front and back cover which are attachable to one another, wherein the front and back cover each comprise an inner wall portion with a c-shaped support,
   wherein the c-shaped support of the front and back cover of each base extend towards each other when the front and back cover are attached;
   LEDs connected to the c-shaped supports of the attached front and back covers, wherein the LEDs refract light through or along the outer edge of the facepiece and through or along the etched portions of the facepiece; and
   straps comprising a first and second end, wherein the first end is connected to the arm of each temple and the second end is connected to a housing.

2. The wearable, illuminating mask of claim 1, wherein the facepiece comprises slots located in side edges thereof, which slots point towards the facepiece.

3. The wearable, illuminating mask of claim 1, wherein a composition of the mask comprises a plastic material which refracts light.

4. The wearable, illuminating mask of claim 1, wherein a length of the straps are adjustable.

5. The wearable, illuminating mask of claim 1, wherein the housing comprises a power source and control circuitry, which both are electrically connected to the LEDs.

6. The wearable, illuminating mask of claim 5, wherein the control circuitry comprises a receiver and a proximity detection device.

7. The wearable, illuminating mask of claim 6, wherein the control circuitry detects a first signal location proximate to a first proximity beacon and illuminates the LEDs in a pattern associated with the first signal location.

8. The wearable, illuminating mask of claim 5, wherein the power source and control circuitry are communicatively activated by a remote device.

9. A wearable, illuminating mask comprising:
   a facepiece comprising slots located in side edges thereof, which slots point towards the facepiece, eyeholes, a nosepiece and etched and non-etched portions, wherein an outer edge of the facepiece is etched;
   temples, each temple comprising a base connected to one of the side edges of the facepiece and an arm extending away from the base;
   wherein each base of the temples comprises a front and back cover which are attachable to one another, wherein the front and back cover each comprise an inner wall portion with a c-shaped support,
   wherein the c-shaped support of the front and back cover of each base extend towards each other when the front and back cover are attached;
   LEDs connected to the c-shaped supports of the attached front and back covers, wherein the LEDs refract light through or along the outer edge of the facepiece and through or along the etched portions of the facepiece; and
   straps comprising a first and second end, wherein the first end is connected to the arm of each temple and the second end is connected to a housing.

10. The wearable, illuminating mask of claim 9, wherein a composition of the mask comprises a plastic material which refracts light.

11. The wearable, illuminating mask of claim 9, wherein the housing comprises a power source and control circuitry, which both are electrically connected to the LEDs.

12. The wearable, illuminating mask of claim 11, wherein the control circuitry comprises a receiver and a proximity detection device.

13. The wearable, illuminating mask of claim 12, wherein the control circuitry detects a first signal location proximate to a first proximity beacon and illuminates the LEDs in a pattern associated with the first signal location.

14. The wearable, illuminating mask of claim 11, wherein the power source and control circuitry are communicatively activated by a remote device.

15. A wearable, illuminating mask comprising:
   a facepiece comprising slots located in side edges thereof, which slots point towards the facepiece, eyeholes, a nosepiece and etched and non-etched portions, wherein an outer edge of the facepiece is etched;
   temples, each temple comprising a base connected to one of the side edges of the facepiece and an arm extending away from the base;
   wherein each base of the temples comprises a front and back cover which are attachable to one another around the side edges of the facepiece, wherein the front and back cover of each base comprise an inner wall portion with a c-shaped support,
   wherein the c-shaped support of the front and back cover of each base extend towards each other when the front and back cover are attached;
   LEDs connected to the c-shaped supports of the attached front and back covers and further positioned within the slots of the facepiece, wherein the LEDs refract light through or along the outer edge of the facepiece and through or along the etched portions of the facepiece; and
   straps comprising a first and second end, wherein the first end is connected to the arm of each temple and the second end is connected to a housing.

16. The wearable, illuminating mask of claim 15, wherein the housing comprises a power source and control circuitry, which both are electrically connected to the LEDs.

17. The wearable, illuminating mask of claim 16, wherein the control circuitry comprises a receiver and a proximity detection device.

18. The wearable, illuminating mask of claim 17, wherein the control circuitry detects a first signal location proximate to a first proximity beacon and illuminates the LEDs in a pattern associated with the first signal location.

19. The wearable, illuminating mask of claim 16, wherein the power source and control circuitry are communicatively activated by a remote device.

20. The wearable, illuminating mask of claim 15, wherein a composition of the mask comprises a plastic material which refracts light.

* * * * *